Nov. 12, 1935.  W. SCHAAKE  2,020,910
OVERHEAD CROSSING
Filed Sept. 27, 1933
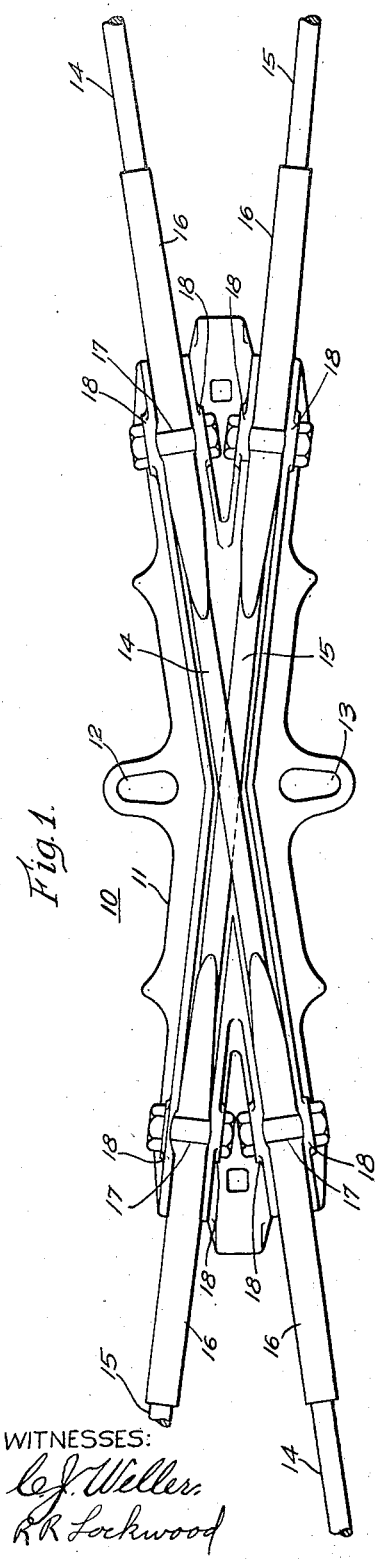
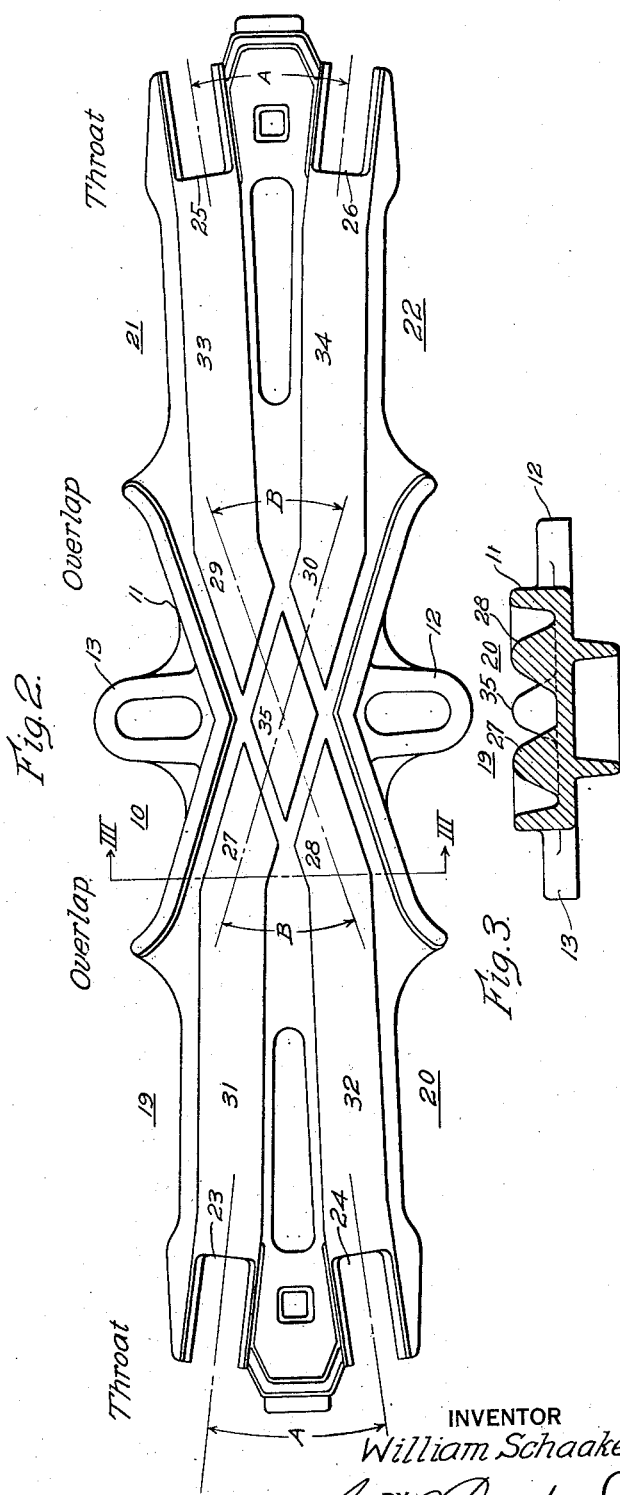
INVENTOR
*William Schaake.*

Patented Nov. 12, 1935

2,020,910

UNITED STATES PATENT OFFICE 2,020,910

OVERHEAD CROSSING

William Schaake, Pittsburgh, Pa., assignor to Westinghouse Electric & Manufacturing Company, East Pittsburgh, Pa., a corporation of Pennsylvania Application September 27, 1933, Serial No. 691,155

9 Claims. (Cl. 191—37)

My invention relates, generally, to trolley systems for electrically-propelled vehicles and it has particular relation to overhead crossings used at the junctions of intersecting trolley wires.

In certain instances in the construction of overhead trolley systems, it is desirable to have the trolley wires intersect at relatively small angles. Such a condition is found where the streets over which the trolley wires are placed intersect at a relatively small angle, so that it is necessary to provide a crossing of such nature that the directions of the streets may be followed. Such conditions are also found in car barns and yards where it is desirable to so arrange the overhead trolley system as to provide for a maximum use of the traction system.

When a small angle crossing is used, there is at present the problem of so arranging the underruns or guide members of the crossing that the current collector, be it either of the wheel or shoe type, will be free to traverse the desired guide members without the likelihood of its following the wrong guide member or becoming jammed, or dewired. It will be readily understood that, when a small angle crossing is used, the clearances are relatively close and, although a crossing may be satisfactory when it is new, it may become so worn after slight use as to be unreliable in operation.

In the event that the current collector should jam in the crossing, there is a likelihood that the overhead system may be partially torn down or that the current collector may be pulled apart or damaged or both. In any event, there is always the possibility that pedestrians or vehicles underneath the crossing may be severely injured by the parts falling on them. Further, there is the possibility of delay incident to a mere dewirement without further injury to the overhead system or current collector. When such occurs, it is necessary for the operator of the vehicle to leave it in order that he may restore the current collector to its proper position.

While certain of the foregoing difficulties may be largely obviated when the small angle crossing is used in conjunction with a traction system in which the vehicles are operated on tracks, they are augmented when trolley busses are used which do not follow any particular predetermined path but rather follow an irregular path depending upon traffic and other conditions. As is well known, trolley busses of the trackless type are capable of swinging from the center of the street to the curb line in order to take on and discharge passengers, as well as to alter their paths as traffic conditions may warrant. In order to ensure satisfactory operation of the current collecting equipment especially when such vehicles are used, it is desirable that the overhead trolley system be especially adapted for such operation.

It is, therefore, an object of my invention to provide an overhead crossing which shall be simple and efficient in operation and which may be readily and economically manufactured and installed.

Another object of my invention is to provide for assuring positive operation of a small angle crossing located at the junction of trolley wires intersecting at the small angle.

Another object of my invention is to prevent jamming in the operation of small angle crossings.

Another important object of my invention is to provide for entering the throat of a trolley wire crossing at one angle and crossing it at a different angle.

A still further object of my invention is to provide for entering the throat of a trolley wire crossing at a relatively small angle, crossing it at a relatively larger angle and leaving it at the small angle.

Other objects of my invention will in part be obvious and in part appear hereinafter.

My invention accordingly is disclosed in the embodiment thereof shown in the accompanying drawing and comprises the features of construction, combination of elements and arrangement of parts which will be exemplified in the construction hereinafter set forth and the scope of the application which will be indicated in the appended claims.

For a more complete understanding of the nature and scope of my invention, reference may be had to the following detailed description taken in connection with the accompanying drawing, in which Figure 1 is a view, in top elevation, of a trolley wire crossing illustrating a concrete exemplification of my invention;

Fig. 2 is an enlarged view, in bottom elevation, of the crossing illustrated in Fig. 1; and Fig. 3 is a sectional view taken along the line III—III of Fig. 2.

Referring now to the drawing, the reference character 10 designates generally a trolley crossing having a main body member 11 provided with oppositely disposed lugs 12 and 13, having openings therein, to provide for the connection of suitable guy wires that are commonly used for the support of overhead trolley wire systems. As illustrated, the crossing 10 is positioned at the intersection of two trolley wires 14 and 15, which extend in the directions along which it is desired to have electric vehicles travel.

Suitable approach members 16 are provided for effecting a smooth transition of a current collector (not shown) from the trolley wire 14 or 15 to the crossing 10, as is readily understood. The approaches 16 may be secured to the crossing 10 by any suitable means such as the bolts 17 which are positioned in suitable lugs 18 integrally formed with the main body member 11.

As illustrated more clearly in Fig. 2 of the drawing, the body member 11 is provided with integrally formed under-runs or guide members shown generally at 19, 20, 21, and 22. Each of the guide members comprises, respectively, an approach portion 23, 24, 25, and 26, an overlap portion 27, 28, 29, and 30, and a transition portion, 31, 32, 33, and 34, extending between the approach and overlap portions.

The approach portions 23 and 24 at the left-hand end and 25 and 26 at the right-hand end are disposed at what may be termed the "throats" of the crossing 10 at an angle which is the same as that which the conductors 14 and 15 intersect. The transition members 31, 32, 33, and 34 provide for a gradual transition of the current collector to and from the overlap portions 27, 28, 29, and 30 in the direction of movement of the current collector in traversing the crossing 10. A central member 35 is provided which is common to either direction of movement of the current collector, as will be readily understood.

While the guide members 19, 20, 21, and 22 and the common member 35 may be secured to the body member 11 by any suitable means, I prefer to form them integrally therewith. That is, the whole crossing 10 illustrated in Fig. 2 of the drawing may comprise a single casting thereby ensuring corect and positive alignment of all of the various parts and at the same time reducing the cost of manufacture to a minimum.

The angle A at which the trolley wires 14 and 15 intersect at the throat, in a specific embodiment of my invention, has been made 15 degrees, while the angle B at the overlap has been made 23 degrees. In order to more clearly illustrate the invention, the angle B in Fig. 2 of the drawing has been considerably exaggerated. It will be understood that any other combination of angles may be used at the throat and at the overlap without departing from the scope of this invention. However, the combination of an angle of 15 degrees at the throat and an angle of 23 degrees at the overlap has been found in practice to be a very desirable combination.

It will be observed that, in operation, as the current collector enters the throat, it is still following the same line of direction as it followed while traversing either of the trolley wires 14 or 15. After the current collector has entered the throat, its direction of movement is gradually changed by the appropriate transition portion of the appropriate guide member until the overlap is reached, at which it is caused to cross the central part of the crossing 10 at a relatively greater angle than it would cross it if the original direction were still followed. It will be readily understood that, by crossing at a larger angle, the likelihood of the current collector jamming or being damaged is reduced to a minimum. Positive action of the crossing is thereby assured with the result that the operation of the overhead system is considerably enhanced.

While the double angle crossing illustrated and described hereinbefore is of particular value when used in connection with electric vehicles of the trackless type, such as trolley buses, it will be understood, of course, that this crossing may also be used in overhead systems which are used for supplying power to vehicles which are adapted to travel along tracks or rails laid in the street.

Since certain further changes may be made in the above construction, and different embodiments of the invention may be made without departing from the scope thereof, it is intended that all matter contained in the above description or shown in the accompanying drawing shall be interpreted as illustrative and not in a limiting sense.

I claim as my invention:

1. An overhead conductor crossing for use in electric trolley systems comprising, in combination, a main body member, and guide arms angularly disposed on said body member, said guide arms being disposed to cause a current collector to enter the crossing at one angle and to cross it at a greater angle, the angle of intersection of the conductors remaining substantially constant throughout the length of the crossing.

2. An overhead conductor crossing for use in electric trolley systems comprising, in combination, a main body member, and guide arms angularly disposed on said body member, said guide arms being disposed to cause a current collector to enter the crossing at a relatively small angle and to cross it at a relatively larger angle and permitting the angle of intersection of the conductors to remain substantially constant throughout the length of the crossing.

3. An overhead conductor crossing for use in electric trolley systems comprising, in combination, a main body member, and guide arms integrally formed with said body member and angularly disposed along intersecting directions, said guide arms entering the crossing at one angle and crossing it at a greater angle, the angle of intersection of the conductors remaining substantially constant throughout the length of the crossing.

4. An overhead conductor crossing for use in electric trolley systems comprising, in combination, a main body member, and guide arms integrally formed with said body member and angularly disposed along intersecting directions, said guide arms entering the crossing at a relatively small angle and crossing it at a relatively large angle, the angle of intersection of the conductors remaining substantially constant throughout the length of the crossing.

5. In an overhead conductor crossing for use in electric trolley systems a plurality of pairs of guide arms disposed at one angle at the throat and at a greater angle at the overlap, the angle of intersection of the conductors remaining substantially constant throughout the length of the crossing.

6. In an overhead conductor crossing for use in electric trolley systems, a plurality of pairs of guide arms disposed at a relatively small angle at the throat and at a relatively larger angle at the overlap, the angle of intersection of the conductors remaining substantially constant throughout the length of the crossing.

7. In an overhead conductor crossing for use in electric trolley systems, a plurality of pairs of guide arms relatively disposed at a fifteen degree angle at the throat and at a twenty-three degree angle at the overlap, the angle of intersection of the conductors remaining substantially constant throughout the length of the crossing.

8. In an overhead conductor crossing for use in electric trolley systems, a plurality of pairs of guide arms relatively disposed at a fifteen degree angle at the throat and at a larger angle at the overlap, the angle of intersection of the conductors remaining substantially constant throughout the length of the crossing.

9. In an overhead conductor crossing for use in electric trolley systems, a plurality of pairs of guide arms relatively disposed at a twenty-three degree angle at the overlap and at a smaller angle at the throat, the angle of intersection of the conductors remaining substantially constant throughout the length of the crossing.

WILLIAM SCHAAKE.